(12) United States Patent
Amezawa

(10) Patent No.: US 6,459,884 B1
(45) Date of Patent: Oct. 1, 2002

(54) METHOD OF AND APPARATUS FOR ESTIMATING THE CHARACTERISTICS OF A RADIO CHANNEL ON WHICH A PILOT CHANNEL PARTIALLY DEFECTIVE IS CONVEYED

(75) Inventor: Yasuharu Amezawa, Tokyo (JP)

(73) Assignee: Oki Electric Industry Co, Ltd., Tokyo (JP)

( * ) Notice: Subject to any disclaimer, the term of this patent is extended or adjusted under 35 U.S.C. 154(b) by 0 days.

(21) Appl. No.: 09/357,857

(22) Filed: Jul. 21, 1999

(30) Foreign Application Priority Data

Jul. 22, 1998 (JP) .......................................... 10-206133

(51) Int. Cl.[7] .............................................. H04B 7/216
(52) U.S. Cl. ........................................ 455/67.6; 455/62
(58) Field of Search ..................... 455/208, 62, 67.6; 375/208, 142, 150, 343

(56) References Cited

U.S. PATENT DOCUMENTS 5,506,865 A * 4/1996 Weaver, Jr. ................. 375/205
6,141,542 A * 10/2000 Kotzin et al. ............... 455/101
6,141,562 A1 * 3/2001 Henderson et al. ........ 455/67.1
6,304,563 B1 * 10/2001 Blessent et al. ............ 370/335

* cited by examiner

Primary Examiner—Daniel Hunter
Assistant Examiner—Alan Gantt
(74) Attorney, Agent, or Firm—Rabin & Berdo, P.C.

(57) ABSTRACT

The characteristics of a radio channel is estimated over which pilot signals are transmitted consecutively together with TPC signals in the cdma2000 system. From the pilot signals demodulated into baseband signals, obtained are correlated values of a field of the pilot signals preceding the TPC field and of the TPC signals with the spread spectrum codes. Both of the correlated values are operated to determine data represented by the TPC signals. The data thus determined are removed from the TPC signals to restore the pilot signals which would have appeared unless multiplied with the spread spectrum codes in the TPC bit field. The characteristics of the radio channel are estimated from the pilot signals including the TPC bit field from which the data determined have been removed.

16 Claims, 6 Drawing Sheets

METHOD OF AND APPARATUS FOR ESTIMATING THE CHARACTERISTICS OF A RADIO CHANNEL ON WHICH A PILOT CHANNEL PARTIALLY DEFECTIVE IS CONVEYED

BACKGROUND OF THE INVENTION

1. Field of the Invention

The present invention relates to a method of and apparatus for estimating the characteristics of a radio path or channel over which a reference signal partially defective is transmitted.

2. Description of the Background Art

For the purpose of demodulating information signals transmitted over a transmission or radio channel, the system for estimating the characteristics of the radio channel is adapted to use a reference signal, such as a pilot signal, included in the signals transmitted over the radio channel. There is a type of transmission system using a reference signal that includes a part or field which cannot be directly utilized in estimating the characteristics of the radio channel.

In general, there is a method of estimating the characteristics of a radio channel by continuously watching a pilot channel, which is separately provided from a channel containing user information or utility data signals. With such a method, the pilot signals, which are not modulated with data signals, are consecutively transmitted over a pilot channel separately provided from a utility data channel. A receiver system is adapted to receive the pilot signals consecutively on a time axis and calculate the moving average, for example, of the pilot signals in a predetermined period of time. On the basis of the moving average thus calculated, the receiver in turn estimates the characteristics of the radio channel over which the pilot signals have been transmitted so as to appropriately demodulate the utility data signals.

The cdma2000 system, regulated by the IS-95 Standard, is one of the most interesting services of the mobile telephone, and provides the most attractive features of establishing the much more improved sound quality comparable to the stationary telephone and the much more increased data transmission rate over 64 kbps (bit per second) as well as the global roaming capability. The cdma2000 system introduces the TPC (Transmission Power Control) bits into the pilot channel transmitted on a reverse link from a mobile station to a base station.

The inclusion of the TPC bits in a pilot channel of the cdma2000 system follows that the field of TPC bits in the pilot channel lacks information on the characteristics of a channel for transmitting utility data, giving rise to a difficulty in direct estimation of the channel characteristics.

SUMMARY OF THE INVENTION

It is therefore an object of the present invention to provide a method of and apparatus for appropriately estimating the characteristics of a radio channel even when a reference signal transmitted over the radio channel is partially defective.

In accordance with the present invention, the characteristics of a radio channel is estimated over which a reference signal are transmitted consecutively together with an additional signal, other than the reference signal. From the reference signal demodulated into a baseband signal, obtained are a first correlated value of at least a first part of the reference signal which is closer to the additional signal on a time axis and a second correlated value of the additional signal with the spread spectrum codes. The first and second correlated values are operated to determine data represented by the additional signal. The data thus determined are removed from the additional signal to restore a second part of the reference signal which would have appeared unless multiplied with the spread spectrum codes. The characteristics of the radio channel are estimated from the reference signal including the first part and the second part from which the data determined have been removed.

In accordance with the present invention, a method of estimating characteristics of a radio channel over which a reference signal is transmitted consecutively together with an additional signal, other than the reference signal, with a sequence of spread spectrum codes multiplied, comprises: a first step of receiving the reference signal and the additional signal from the radio channel and demodulating the reference signal and the additional signal received into a baseband signal; a second step of obtaining in the baseband signal a correlated value of at least a first part of the reference signal which is closer to the additional signal on a time axis with the sequence of spread spectrum codes to produce a first correlated value; a third step of obtaining in the baseband signal a correlated value of the additional signal with the sequence of spread spectrum codes to produce a second correlated value; a fourth step of operating the first correlated value and the second correlated value to determine data represented by the additional signal; a fifth step of removing the data from the additional signal to restore a second part of the reference signal which would have appeared unless multiplied with the sequence of spread spectrum codes; and a sixth step of estimating the characteristics of the radio channel on the basis of the reference signal including the first part and the second part from which the data have been removed.

Further in accordance with the invention, apparatus for estimating characteristics of a radio channel over which a reference signal is transmitted consecutively together with an additional signal, other than the reference signal, with a sequence of spread spectrum codes multiplied, comprises: a demodulator for receiving the reference signal and the additional signal from the transmission channel and demodulating the reference signal and the additional signal received into a baseband signal; a first correlator circuit for obtaining in the baseband signal a correlated value of at least a first part of the reference signal which is closer to the additional signal on a time axis with the sequence of spread spectrum codes to produce a first correlated value; a second correlator circuit for obtaining in the baseband signal a correlated value of the additional signal with the sequence of spread spectrum codes to produce a second correlated value; a determining circuit for operating the first correlated value and the second correlated value to determine data represented by the additional signal; a data remover circuit for removing the data from the additional signal to restore a second part of the reference signal which would have appeared unless multiplied with the sequence of spread spectrum codes; and an estimator circuit for estimating the characteristics of the radio channel on the basis of the reference signal including the first part and the second part with the data removed by said data remover circuit.

There is also provided in accordance with the invention, apparatus for demodulating a utility data signal transmitted over a radio channel, over which a reference signal is transmitted consecutively together with an additional signal, other than the reference signal, with a sequence of spread spectrum codes multiplied, which comprises: a demodulator for receiving the reference signal and the additional signal from the radio channel and demodulating the reference signal and the additional signal received into a baseband signal; a first correlator circuit operative in response to an estimate signal representative of estimated characteristics of the radio channel for correlating the utility data signal of the baseband signal with the sequence of spread spectrum coded to develop a resultant utility data signal; a second correlator circuit for obtaining in the baseband signal a correlated value of at least a first part of the reference signal which is closer to the additional signal on a time axis with the sequence of spread spectrum codes to produce a first correlated value; a third correlator circuit for obtaining in the baseband signal a correlated value of the additional signal with the sequence of spread spectrum codes to produce a second correlated value; a determining circuit for operating the first correlated value and the second correlated value to determine data represented by the additional signal; a data remover circuit for removing the data from the additional signal to restore a second part of the reference signal which would have appeared unless multiplied with the sequence of spread spectrum codes; and an estimator circuit for estimating the characteristics of the radio channel on the basis of the reference signal including the first part and the second part with the data removed by said data remover circuit to deliver the estimate signal representing the characteristics estimated to said first correlator circuit.

BRIEF DESCRIPTION OF THE DRAWINGS

The objects and features of the present invention will become more apparent from consideration of the following detailed description taken in conjunction with the accompanying drawings in which.

DESCRIPTION OF THE PREFERRED EMBODIMENTS

Figure 1:
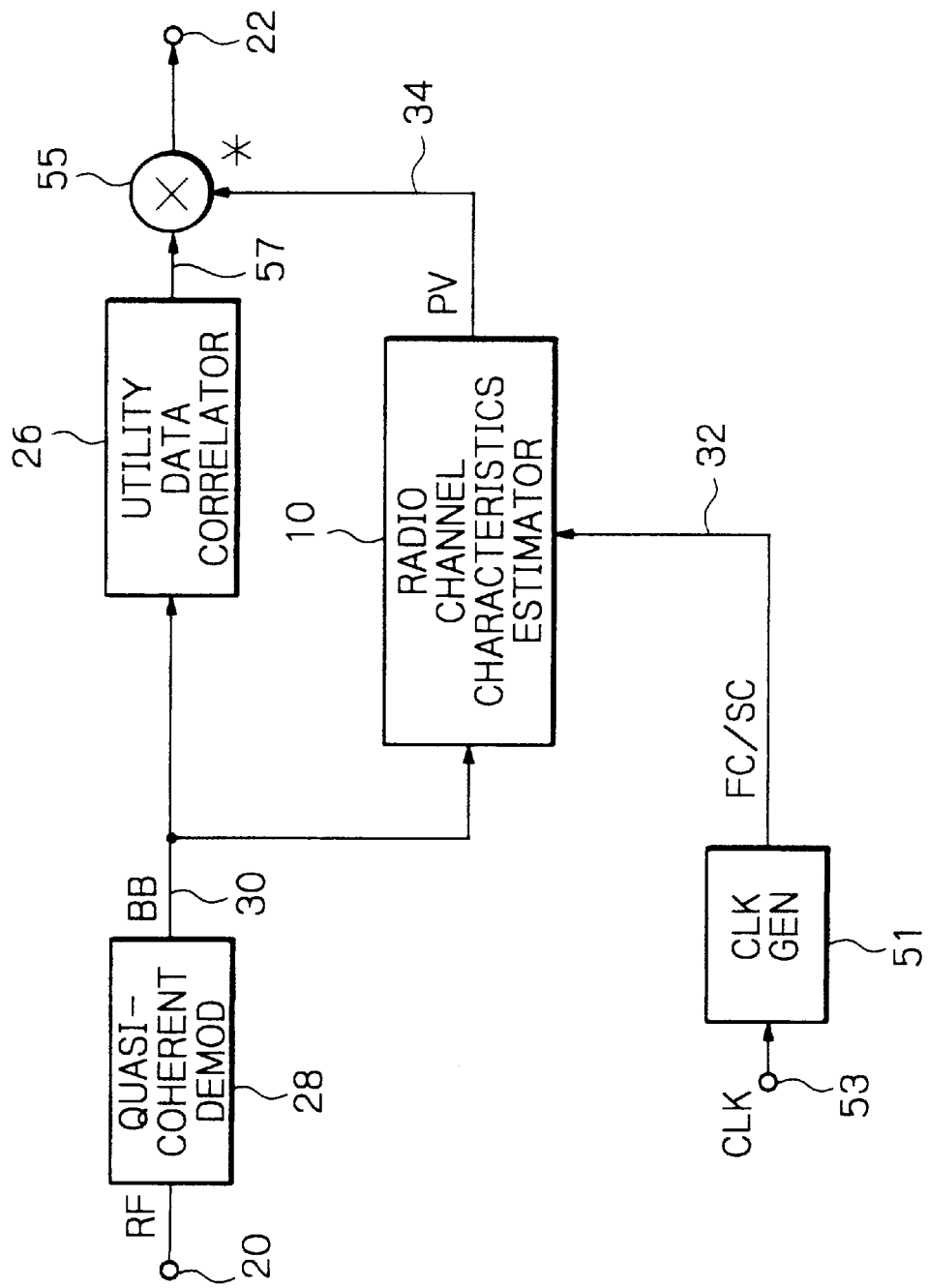
FIG. 1 schematically shows a preferred embodiment of a demodulator including a radio channel characteristics estimator in accordance with the present invention.

With reference to FIG. 1, a preferred embodiment of a demodulator including a radio channel characteristics estimator 10 in accordance with the present invention is advantageously applicable to the cdma2000 system, which is regulated by the IS-95 Standard. In an application of mobile telephone, the demodulator is installed in a base station, not shown, and adapted to receive on its input port 20, and demodulate, user information or utility data signals and pilot signals which are transmitted as reference signals on a reverse radio link from mobile stations, not shown, to produce resultant baseband signals representing user information or utility data on its output port 22. The invention is not exclusively applicable to the specific embodiment but embodiments operable with the phase shift keying (PSK) system as well as the quadrature PSK (QPSK) system.

Figure 3:
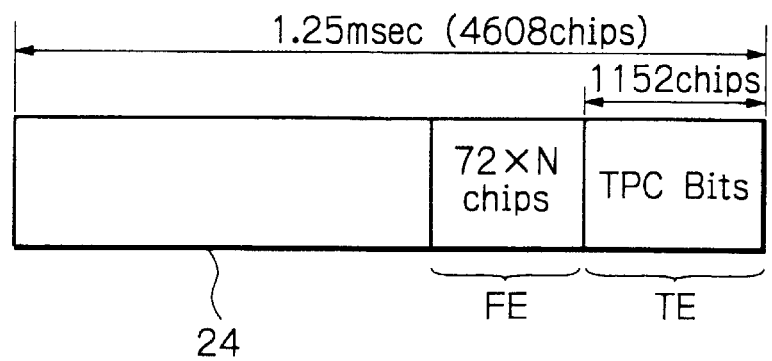
FIG. 3 schematically shows an exemplified signal format of a pilot channel employed by the embodiment shown in FIG. 1.

In general, the radio channel format of the cdma2000 system includes a user information or utility data channel and a pilot channel 24, FIG. 3. The pilot channel 24 contains reference, or pilot, signals which are not modulated with data so that they all consist of the binary value "0", independently of utility data, except for the part or field TE described later. Alternatively, the pilot signals may contain the binary value "1" at all bit positions except for the field TE. The pilot signals 24 are therefore used as reference signals, on the basis of which the radio channel characteristics estimator 10 estimates the characteristics of the radio channel or transmission path on the reverse radio link. In the application of mobile telephone, the utility data may contain speech signals.

The demodulator shown in FIG. 1 includes a quasi-coherent demodulator 28 which is adapted to receive on its input terminal or port 20 radio frequency signals RF transmitted over the reverse link and demodulate the signals RF into baseband signals BB, which are in turn developed from its output port 30.

The output port 30 from the quasi-coherent demodulator 28 is on the one hand interconnected to an input to the radio channel characteristics estimator 10, and on the other hand to an input to a utility data correlator 26. In the following, signals appearing on connection lines of the circuitry are designated by reference numerals associated with the connection lines.

The radio channel characteristics estimator 10 is adapted for receiving the baseband pilot signals BB and deriving the moving average of the pilot signals from the baseband signals BB in timed with a frame clock signal FC and a symbol clock signal SC generated by a clock generator 51, described later, and provided on its clock terminal 32. The estimator 10 produces resultant signals PV on its output port 34. The estimate signal PV represents the estimated characteristics of the radio channel over the reverse link, and includes information on the envelope and the rotation of the phase of the received waveforms in the form of a vector comprising its real and imaginary parts. The output port 34 is interconnected to an input port of a multiplier 55.

The clock generator 51 has an input port 53 connected to receive a reference clock signal CLK, and is adapted to produce the frame and symbol clock signals FC and SC on its output port 32. The reference clock CLK may be supplied from a common clock source, not shown, in the base station, which source generates the reference clock CLK from the signals obtained from the GPS system, in the specific embodiment.

The utility data correlator 26 is adapted to receive the baseband signals BB on its input port 30 and correlate the incoming utility data, or speech, signals 30 with a predetermined sequence of spreading codes generated therein to deliver signals resultant from the correlation on its output port 57 to another input to the multiplier 55. The multiplier 55 is adapted to multiply the correlation signals 57 with the complex conjugate, as represented by an asterisk (*) in the figure, of the estimate signal PV to produce on its output port 22 the utility data signals, which have been free from the effects of the phase characteristics of the radio channel. The output signals 22 will be combined in the Rake fashion with signals from other demodulators, not shown. The estimate signal PV may also be used for measuring the characteristics of the electromagnetic waves received by the base station from a mobile station, or telephone set.

As shown in FIG. 3, with the specific embodiment, the pilot channel 24 in accordance with the cdma2000 system contains 4,608 chips in the period of 1.25 msec. Among those chips, specific 1,152 chips form a part or field TE, to which the sixteen TPC (Transmission Power Control) bits are assigned, as shown in the figure. The TPC bits are transmitted from a mobile station to the base station for use in transmission power control. In other words, the portion TE of the pilot channel 24 is modulated with the specific binary values, or data, of the TPC bits, and the remaining portions of the pilot channel 24 are all constituted by the binary value "0", or alternatively by the binary value "1".

Figure 2:
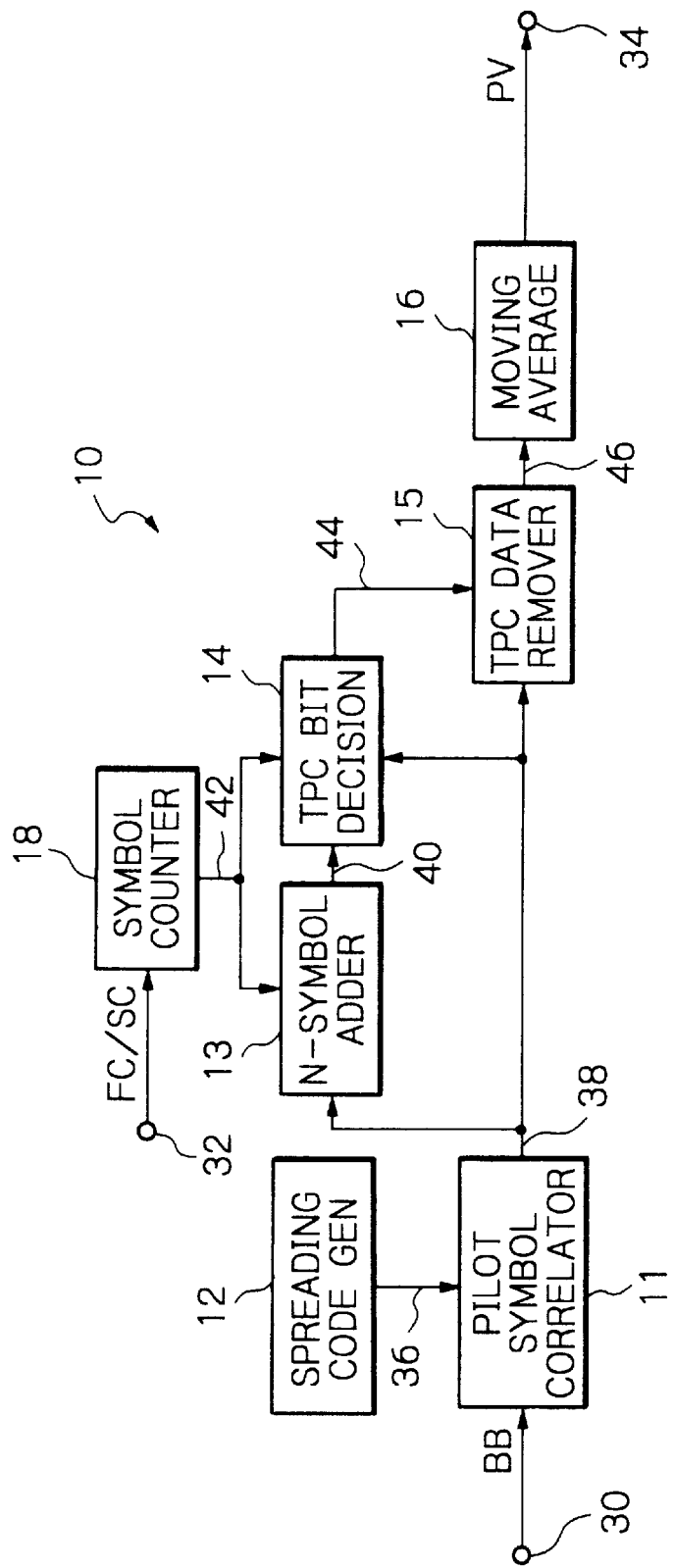
FIG. 2 is a schematic block diagram showing the radio channel characteristics extimator included in the embodiment shown in FIG. 1.

Now, referring to FIG. 2, a specific example of the radio channel characteristics estimator 10 includes a pilot symbol correlator 11 having its input port interconnected to the output 30 from the quasi-coherent demodulator 28. The estimator 10 also includes a spreading code generator 12, which functions as generating a predetermined sequence of spread spectrum codes on its output port 36, which is interconnected to another input port of the pilot symbol correlator 11.

The pilot symbol correlator 11 is adapted to receive the baseband pilot signals BB and the spreading codes 36, and obtain a correlated value for each of the symbols carried by the baseband pilot signals BB in the fields FE and TE, described later, with the spreading codes 36.

More specifically, in the illustrative embodiment, each 72 chips of the baseband pilot signals BB correspond to one symbol period, and the chip rate is fixed at a predetermined value. The correlator 11 multiplies the baseband pilot signals BB in the portions or fields FE and TE with a predetermined sequence of spreading codes 36 to produce correlated values, each of which represents in the period of 72 chips how a symbol correlates to a spreading code 36. The correlator 11 has its output port 38 interconnected to an N-symbol adder 13 and a TPC bit decision circuit 14. From the output 38 of the correlator 11, correlated values for the symbols included in the field TE of the TPC bits, FIG. 3, and the consecutive 72×N chips included in the field FE, immediately preceding the former, of the baseband pilot signals BB are sequentially transferred to the N-symbol adder 13 and the TPC bit decision circuit 14, respectively.

The output port 38 from the correlator 11 is also interconnected to a TPC data remover circuit 15. From the output 38 of the correlator 11, the pilot symbol correlator 11 also develops consecutively the values of the chips which represent the waveforms, and hence the symbols, of all the baseband pilot signals BB to the TPC data remover 15 in the entire duration or period of the pilot channel 24. In the specific embodiment, bits "0" and "1" are decoded into symbol values "+1" and "−1", respectively.

The N-symbol adder 13, having its input port interconnected to the output port 38 of the correlator 11, is adapted to take in correlated values which the correlator 11 calculates and developes for the successive 72×N chips, i.e. N symbols, included in a field FE, FIG. 3, immediately preceding the field TE of the TPC bits, and to add, or accumulate, all of the correlated values for those successive chips in the field FE to produce a reference correlated value on its output port 40, where the number N is a positive integer. The reference correlated value 40 thus obtained, which will be used as a reference value in the processings following thereto, is held in the adder 13 and delivered to the TPC bit decision circuit 14. Advantageously in the embodiment, N=16, which is equal to the number of the symbols carried by the TPC bit field TE, this means that the number of the chips upon which the reference correlated value 40 is based in the pilot signals 24 may be equal, or comparable, to the number of the chips included in the TPC bit field TE, i.e. 1,152 chips.

The invention is not limited to the specific details of the illustrative embodiment. For example, the number N of the chips included in the field FE may be a natural number other than "16," as will be described later. In addition, the N chips in the field FE, which are to be taken into the N-symbol adder 13, may be spaced from the TPC bit field TE, especially under the condition that the characteristics of a transmission channel is not erratically or abruptly changeable.

The N-symbol adder 13 is operative in response to a count 42 supplied from a symbol counter 18. The symbol counter 18 is adapted to receive the frame and symbol clock signals FC and SC, and increment in response to each symbol position of the pilot channels 24 to produce on its output port 42 a count representative of the symbol position thus counted in the pilot channel 24. The N-symbol adder 13 performs the adding operation in response to a count 42 provided from the symbol counter 18.

The output port 40 of the N-symbol adder 13 is interconnected to the input port of the TPC bit decision circuit 14. The TPC bit decision circuit 14 is adapted for receiving correlated values calculated and developed by the correlator 11 for the consecutive TPC bits TE following the field FE, and determining, in timed with a count 42 provided from the symbol counter 18, which of the binary values "0" and "1" each of the TPC bits TE is supposed to take to produce on its output port 44 a decision value representing which binary value each TPC bit is determined to take. In the context, the correlated values calculated by the correlator 11 for the TPC bits TE are referred to as the TPC correlated values.

The output port 44 from the TPC bit decision circuit 14 is interconnected to another input port of the TPC data remover circuit 15. The TPC data remover circuit 15 is adapted to continuously receive the values of the chips which represent the waveforms, or symbols, of the baseband pilot signals BB from the output port 38 of the correlator 11, and remove the components of the decision values 44, supplied from the TPC bit decision circuit 14, from the associated values of the chips contained in the TPC bit field TE.

More specifically, the TPC data remover 15 is operative in response to the TPC bit values 44 determined by the TPC bit decision circuit 14 to remove the components, or data, of the TPC bits determined from the values of the chips 38 associated therewith and representative, as a whole, of the waveforms of the baseband pilot signals BB in the TPC bit field TE to develop the resultant signals from its output port 46. When the remover circuit 15 receives a decision signal 44 representing TPC bit "0" determined by the decision circuit 14, the remover 15 passes the values of the chips 38 which are received from the pilot symbol correlator 11 and represent the waveforms of the chips, and hence a symbol, in the TPC field TE to a moving average circuit 16, whereas when the remover circuit 15 receives a decision signal 44 representing TPC bit "1" determined by the decision circuit 14, the remover 15 inverts the sign of the values of the chips 38 received from the pilot symbol correlator 11 and representing the waveforms of the chips or symbol in the TPC field TE to develop the resultant signal 46, whose sign has been inverted, to the moving average circuit 16. In the period of time except for the TPC bit field TE of the pilot channel 24, the TPC data remover circuit 15 passes the values of the chips 38 received from the pilot symbol correlator 11 and representing the waveforms of the chips in the period of time except for the TPC field TE to the moving average circuit 16.

The moving average circuit 16 is adapted for receiving the chip values 46 with the values of the TPC bits TE removed from the TPC data remover 15, and averaging the newest series of chip values 46 received to produce resultant signals, i.e. estimate signals, PV representing the average of the series of chip values on the output port 34. The number of the chip values 46 in the series, on the basis of which the moving average circuit 16 calculates the average, is predetermined and the chip values 46 included in the series are renewed in a FIFO (first-in first-out) fashion. In an alternative embodiment, the circuitry 16 may be adapted to produce the estimate signals PV on the least square principle instead of the moving average principle.

The removal of the decision values 44 from the associated symbol values of the TPC field TE of the pilot channel 24 by the TPC data remover 15, described above, causes the pilot signals which would have appeared if the pilot signals included in the TPC field TE were not modulated with the TPC bits to be restored so that they reflect the characteristics of the radio channel on the reverse link from the mobile station to the base station. This means that, in the entire period or duration of the pilot channel 24, the TPC data remover circuit 15 consecutively develops on its output port 46 all the symbols which have been carried by the pilot channel 24 with the TPC bits removed.

More specifically, the TPC bit decision circuit 14 is operative in response to receiving a TPC correlated value, defined above, from the output port 38 of the correlator 11, to determine which binary value "0" or "1" a TPC bit, corresponding to the TPC correlated value, of the TPC field TE is estimated to take. For better understanding, before describing the details of the TPC bit decision circuit 14, it is noted that the correlated values, such as the reference correlated values and the TPC correlated values defined above, comprise an in-phase component I and a quadrature component Q. This means that a correlated value is represented by a dot or point, and hence a vector, on an I-Q plane.

Figure 4:
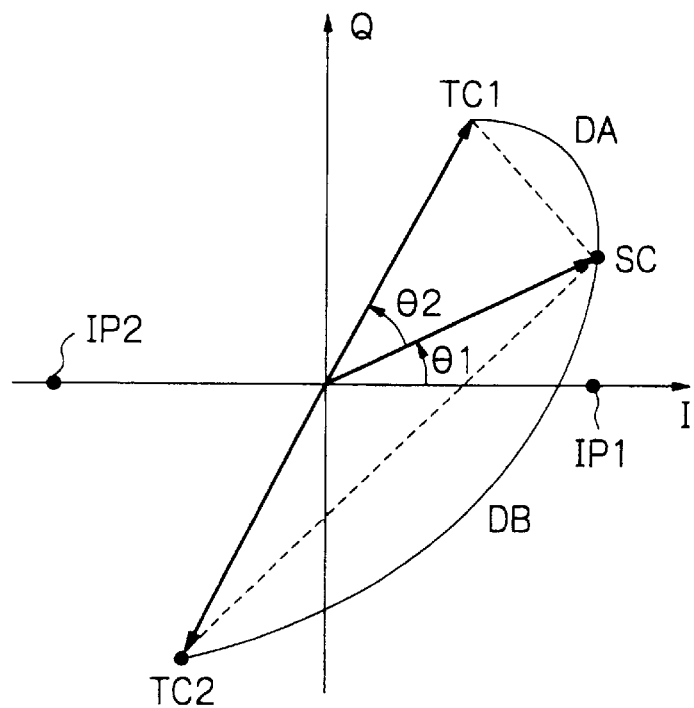
FIG. 4 shows vectors representative of correlated values on an I-Q plane and useful for understanding the way of determining TPC bits in the distance mode of operation.

With reference to FIG. 4, the TPC bit decision circuit 14 receives a TPC correlated value which was calculated by the correlator 11 and is plotted with a vector or dot, such as the point TC1, on the I-Q plane, for the purpose of explaining the functions of the decision circuit 14. The decision circuit 14 in turn generates a point or vector TC2, which has its I and Q components equal in magnitude or amplitude but reverse in sign or polarity to the I and Q components of the vector TC1, respectively.

The operation of generating the vector TC2 from the vector TC1 is made in case each of the TPC bits has not yet been determined as to whether it takes binary "0" or "1". If a TPC bit in question, corresponding to the vector TC1, is binary "0" under the fading-free transmission condition, for example, then the points TC1 and TC2 fall on the points IP1 and IP2, respectively, which have the I component equal to the magnitude of the vectors TC1 and TC2, respectively, and the Q component equal to zero. Also under the fading-free condition, when a TPC bit in question, corresponding to the vector TC1, is binary "1", for example, then the points TC1 and TC2 fall on the points IP2 and IP1, respectively.

From the N-symbol adder 13, the TPC bit decision circuit 14 receives a reference correlated value 40 represented by another dot, or reference point, SC on the I-Q plane. The position of the reference point SC on the I-Q plane is dependent upon the fading which has affected the field FE of N symbols, preceding the TPC bit field TE, on the radio transmission channel of the reverse link. If those N symbols of the field FE are not affected by the fading at all under the ideal condition, then the point SC comes to the point IP1 on the I axis, i.e. the Q component is zero because the symbols on the pilot channel 24 correspond to the binary value "0" at all bit positions except for the TPC bit field TE, and the point IP1 corresponds to the binary value "0".

The fading encountered on the reverese link channel causes the amplitude and the phase of the signals received by the base station to vary. This appears in the form of variations in the magnitude or length and the angle with respect to the I axis, for example, of the vectors SC, TC1 and TC2. For simplicity, the vectors SC, TC1 and TC2 are depicted equal in length to each other in FIG. 4. The angle θ 1 formed by the vector SC with respect to the I axis is dependent upon the Doppler frequency of the radio channel.

The TPC bit decision circuit 14, having calculated the vectors SC, TC1 and TC2 on the I-Q plane, compares the distance DA of the point TC1 from the reference point SC with the distance DB of the point TC2 from the reference point SC. The distances are calculated in the form of the sum of the absolute values, or magnitudes, of the difference in in-phase component and the difference in quadrature component between the vectors. For example, the distance DA is the sum of the magnitudes of the difference in in-phase component and the difference in quadrature component between the vectors SC and TC1. The TPC bit decision circuit 14 adopts one of the points which is shorter in distance. With the specific example shown in FIG. 4, the point TC1 will be adopted because the distance DA is shorter than the distance DB. This means that the TPC bit decision circuit 14 selects the binary value of one of the points TC1 and TC2 which is closer to the reference point SC which represents how the the symbols in the preceding field FE are affected by the radio channel conditions.

With the illustrative embodiment, all the symbols of the pilot signals are binary "0" as described above. When one of the symbols or bits in the feild TE of TPC bits which corresponds to the point TC1 is binary "0", and transmitted under the channel conditions ordinarily expected in the embodiment, the distance DA is therefore shorter than the distance DB associated with that symbol "0" as depicted in FIG. 4, so that the point TC1 will be selected, because the reference point SC is generated from the bits in the preceding field FE, which are binary "0". The angle θ 2 formed by the vector TC1 with respect to the vector SC will be sufficiently smaller than 90 degrees.

The angle θ 2 taking the value of 0 or 180 degrees or the vicinity thereof means that the radio channel is under the expected, or better, conditions, so that the accuracy in determining the TPC bit values, and hence of the resultant estimate signal PV, is higher, whereas the angle θ 2 taking the value of 90 or 270 degrees or the vicinity thereof means that the radio channel is under the worse conditions, so that the error ratio in determining the TPC bit values is higher.

When one of the symbols or bits in the TPC bit field TE which corresponds to the point TC1 is binary "1" and transmitted under the channel conditions ordinarily expected in the embodiment, the TPC bit decision circuit 14 generates the point TC2 which is closer to the point SC than the point TC1 is, so that the circuit 14 selects the point TC2, since the symbol having the binary value "1" is decoded into the bipolar value "−1" in the embodiment.

When the preferable channel conditions are maintained in which the accuracy in determining the TPC bit value and hence of the estimate signals PV is higher, one symbol of the TPC bit field TE which is associated with a TPC correlated value, defined above, which is supplied from the pilot symbol correlator 11 takes binary "0" to cause the point TC1 to be placed in the vicinity of the point SC, whereas one symbol of the TPC bit field TE associated with a TPC correlated value takes binary "1" to cause the point TC2 to be placed in the vicinity of the point SC. For all of the sixteen symbols in the TPC bit field TE, the points TC1 or TC2 which are closer to the reference point SC than the others are expected to appear on both sides with respect to the vector SC and in the vicinity of the point SC, at the substantially equal frequency, for example. Under the most preferable conditions, the averages of the I and Q components of the sixteen points TC1 or TC2 which are closer to the reference point SC well follow the values of the I and Q components of the reference point SC, respectively, and the displacement of those sixteen points from the reference point SC is sufficiently small on the I-Q plane.

With an application in which all the pilot signals 24 are binary "1", the conditions described above will be vice versa, i.e. one symbol of the TPC bit field TE taking the binary "0" or "1" causes the point TC2 or TC1 to be selected, respectively.

The binary value, or data, represented by the one symbol in question, associated with the point TC1 or TC2, in the TPC bit field TE is estimated as corresponding to the hard decision resultant value for the point TC1 or TC2 selected by the TPC bit decision circuit 14. The hard decision is made by the TPC bit decision circuit 14 in such a fashion that the selection of the point TC1 results in determining the binary "0" for the TPC bit in question whereas the selection of the point TC2 results in determining the binary "1" for the TPC bit in question. In other word, the TPC bit in question is estimated as binary "0" or "1" if the distance DA<DB or DB<DA, respectively. The binary value of any of the bits of the TPC bit field TE can be determined irrespectively of however the angle θ 1 varies, i.e. of the radio channel conditions encountered by the bits in the field FE preceding the TPC bit field TE of the pilot channel 24.

Whenever the TPC bit decision circuit 14 receives a TPC correlated value 38 from the pilot symbol correlator 11 for a symbol in the TPC bit field TE, the decision circuit 14 performs the hard decision described above, so that, in the period of TPC bit field TE containing sixteen symbols, the decision circuit 14 repeats the hard decision sixteen times.

Since the decision circuit 14 determines the data, or binary value, of the TPC bits TE on the basis of the distance of the points TC1 and TC2 from the reference point SC, the decision circuit 14 works in the mode of operation which is referred to as the "distance mode" in the context.

Figure 5:
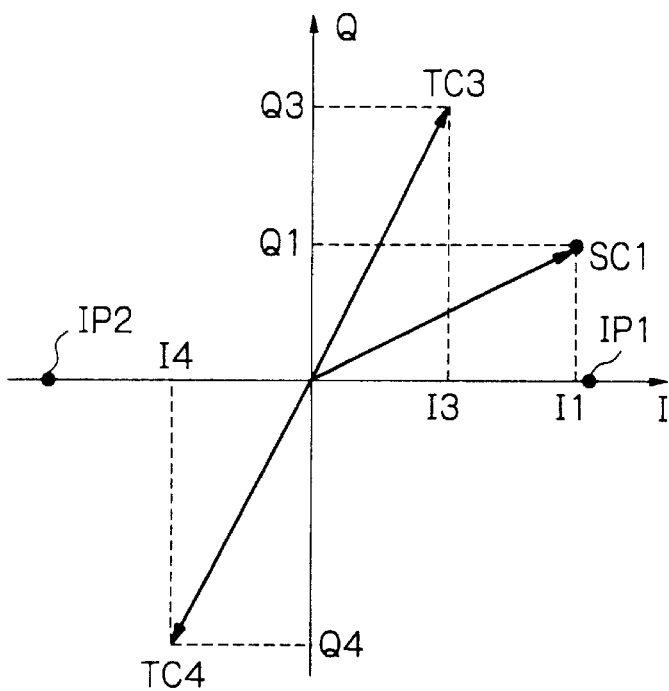
FIG. 5 shows, like FIG. 4, vectors representative of correlated values on an I-Q plane and useful for understanding the way of determining TPC bits in the modified mode of operation.

The TPC bit decision circuit 14 may be adapted to operate in another mode of operation, referred to as the modified mode, into which the distance mode has been simplified as will be described below. Referring now to FIG. 5, the points SC1, TC3 and TC4 correspond to the points SC, TC1 and TC4 in FIG. 4, respectively.

The TPC bit decision circuit 14, adapted to be operable in the modified mode of operation, when having received a reference correlated value 40 from the N-symbol adder 13, determines which of the quadrature and in-phase components of the reference value 40 is larger in absolute value, or magnitude, and how the sign of the larger one is. With the specific example shown in FIG. 5, the vector SC1 has its in-phase component I1 larger than its quadrature component Q1 in amplitude, so that the decision circuit 14 memorizes the sign, positive, of the in-phase component I1 for the data of the point SC1.

In the similar way, the TPC bit decision circuit 14, which has memorized the sign of the in-phase component of the point SC1, determines how the sign of one of the components of the points TC3 and TC4 is, which is the same as the component of which the sign of the point SC1 the decision circuit 14 memorized, i.e. the in-phase component I1 in the instant example, so that the decision circuit 14 selects the signs as the data of the points TC3 and TC4. The sign of the in-phase component I3 of the point TC3 is positive, the same as the sign of the point SC1, in this example to cause the decision circuit 14 to select the point TC3, whereas the sign of the in-phase component I4 of the point TC4 is negative, opposite to the sign of the point SC1, to cause the decision circuit 14 not to select the point TC4.

In an alternative way, the TPC bit decision circuit 14 is adapted to determine the sign of the point TC4 negative directly in response to the sign of the in-phase component I3 of the point TC3 determined positive as described above. This may permit the decision circuit 14 to be designed to exclude the procedures for generating the point TC4 and associated therewith since the point TC4 always has its sign opposite to the sign of the point TC3.

The TPC bit decision circuit 14 selects the point TC3 as described before to determine that the TPC bit in question is binary "0". If the decision circuit 14 selects the point TC4 rather than the point TC3, then it determines that the TPC bit in question is binary "1". Whenever the decision circuit 14 receives a TPC correlated value 38 from the pilot symbol correlator 11 for a symbol in the TPC bit field TE, the decision circuit 14 performs the decision in the modified mode described above, so that, in the duration of TPC bit field TE containing sixteen bits, the decision circuit 14 repeats the decision sixteen times.

In the modified mode of operation, the sign of one of the in-phase and the quadrature components of the point SC1 which is larger in amplitude is selected because if the sign of one of the in-phase and the quadrature components of the point SC1 which is smaller in amplitude were selected then the decision could fail to determine how the TPC bit in question is. For example, when the point SC1 is on the I axis, the quadrature component Q1 is zero so that the sign is indefinte. Under the circumstances, the decision circuit 14 would fail to determine how the TPC bit in question is.

The modified mode of operation may cause the decision circuit 14 to select a distant point on the I-Q plane rather than a closer point dependent upon a specific amplitude or phase of a TPC bit signal. Nevertheless, the TPC bit decision circuit 14 and circuitry associated therewith may be designed simpler in structure and processing than in the distance mode of operation.

In an alternative embodiment, the pilot symbol correlator 11, N-symbol adder 13, TPC bit decision circuit 14 and TPC data remover circuit 15 may be adapted to simply derive correlated values with a predetermined sequence of spreading codes 36 PN in bulk for the chips in the TPC bit field TE, and to compare the latter correlated values with the reference correlated values by the TPC bit decision circuit 14. However, the illustrative embodiment shown and described with reference to FIGS. 2–5 is more preferable to the alternative embodiment mentioned above because the illustratibe embodiment is adapted, as described above, to obtain and utilize the TPC correlated values on a symbol-to-symbol basis in the TPC bit field TE so that errors are corrected by the filtering in estimating the radio channel characteristics.

In operation, the quasi-coherent demodulator 28 receives on its input port 20 the radio frequency signals RF transmitted over the reverse link. The radio frequency signals RF carry user information or utility data signals, such as mobile telephone speech signals, and pilot signals 24. The demodulator 28 in turn demodulates the signals RF into baseband signals BB, which will then be developed from its output port 30 to the radio channel characteristics estimator 10 and the utility data correlator 26.

The radio channel characteristics estimator 10, which ha s received the baseband pilot signals BB, derives the moving average of the pilot signals from the baseband signals BB in timed with the frame and symbol clock signals FC and SC provided on its clock terminal 32 from the clock generator 51. The estimator 10 produces the resultant estimate signal PV from its output port 34 to the one input port of the multiplier 55.

The utility data correlator 26, which has received the baseband signals BB on its input port 30, calculates the correlation of the incoming utility data, or speech, signals 30 with a predetermined sequence of spreading codes generated therein to deliver the signals resultant from the correlation on its output port 57 to the other input to the multiplier 55. The multiplier 55 in turn multiplies the correlation signals 57 with the complex conjugate of the estimate signal PV to produce on its output port 22 the utility data signals which have been free from the effects of the phase characteristics of the radio channel.

More specifically, the pilot symbol correlator 11 of the radio channel characteristics estimator 10 receives the baseband pilot signals 30 from the pilot channel demodulator 28 and the spread spectrum codes 36 from the spreading code generator 12 to obtain a correlated value for each of the symbols carried by the baseband pilot signals BB in the fields FE and TE with the spreading codes 36. More specifically, the correlator 11 multiplies the baseband pilot signals BB in the fields FE and TE with a predetermined sequence of spreading codes 36 to produce correlated values. The correlator 11 delivers correlated values for the symbols included in the consecutive 72×N chips in the field FE and for the TPC bits of the field TE of the baseband pilot signals BB to the N-symbol adder 13 and the TPC bit decision circuit 14, respectively. The correlator 11 also delivers continuously from its output 38 the values of the chips representing the waveforms or symbols of all of the baseband pilot signals BB to the TPC data remover 15 in the entire period of the pilot channel 24.

In timed with a count 42 provided from the symbol counter 18, the N-symbol adder 13 takes in the correlated values for the consecutive N symbols in the field FE, and adds all of the correlated values for those consecutive chips in the field FE to deliver a reference correlated value from its output port 40 to the TPC bit decision circuit 14.

The TPC bit decision circuit 14 in turn receives the TPC correlated values 38 developed by the correlator 11 for the consecutive TPC bits TE following the field FE, and determines, in timed with a count 42 provided from the symbol counter 18, which of the binary values "0" and "1" each of the TPC bits TE is supposed to take. The decision circuit 14 performs the determination in the distance or the modified mode of operation described earlier, and produces on its output port 44 a decision value representing which binary value each TPC bit is determined to take.

The TPC data remover circuit 15 continuously receives the values of the chips representing the waveforms or symbols of the baseband pilot signals BB from the output port 38 of the correlator 11. The TPC data remover circuit 15 in turn removes the components of the decision values 44, supplied from the TPC bit decision circuit 14, from the associated values of the chips contained in the TPC bit field TE. In the period of time except for the TPC bit field TE of the pilot channel 24, the remover circuit 15 passes the values of the chips 38 from the pilot symbol correlator 11 to the moving average circuit 16.

The moving average circuit 16 receives from the TPC data remover 15 the chip values 46 of the baseband signals with the values of the TPC bits TE removed, and averages the newest series of chip values 46 thus received in a FIFO fashion, in the specific embodiment. The resultant, estimate signals PV representing the average of the series of chip values are delivered from the output port 34 of the average circuit 16 to the multiplier 55. Thus, on the output port 34 of the moving average circuit 16, the pilot signals which would have appeared unless the pilot signals included in the TPC field TE were modulated with the TPC bits are restored so that they reflect the characteristics of the radio channel on the reverse link from the mobile station to the base station. The multiplier 55 will then multiply the correlation signals 57 with the complex conjugate of the estimate signal PV to produce on its output port 22 the signals free from the effects of the phase characteristics of the radio channel.

The transmission channel characteristics estimator 10 was simulated by a computer system under the conditions of (1) the chip rate at 3.6864 Mcps (mega-chips per second) (2) by the estimation scheme of the moving average made on 1,152 chips (3) on one-path Doppler transmission channel (4) with the interference of the white Gaussian noise (5) without filter (6) completely in-phase (7) in the duration of two seconds. In the computer simulation, comparison was made between the correlated values of the 1,152 chips, corresponding to N=16, in the field FE preceding the TPC bit field TE and the correlated values of the respective sets of 72 chips in the TPC bit field TE to estimate the values of the bits in the TPC field TE, thus restoring the signals in the pilot channel 24 which would have been free from being modulated with the TPC bits, and the restored pilot signals were continuously used to thereby cause the radio channel to be estimated.

When the radio channel characteristics were estimated, the moving average scheme (2) was applied, and the radio channel was patterned after one-path Doppler (3) free from the multiple-path effects. In addition, the virtual receiver in the base station did not include a band-limited filter (5). This means the simulation was free from band limitation.

Figure 6:
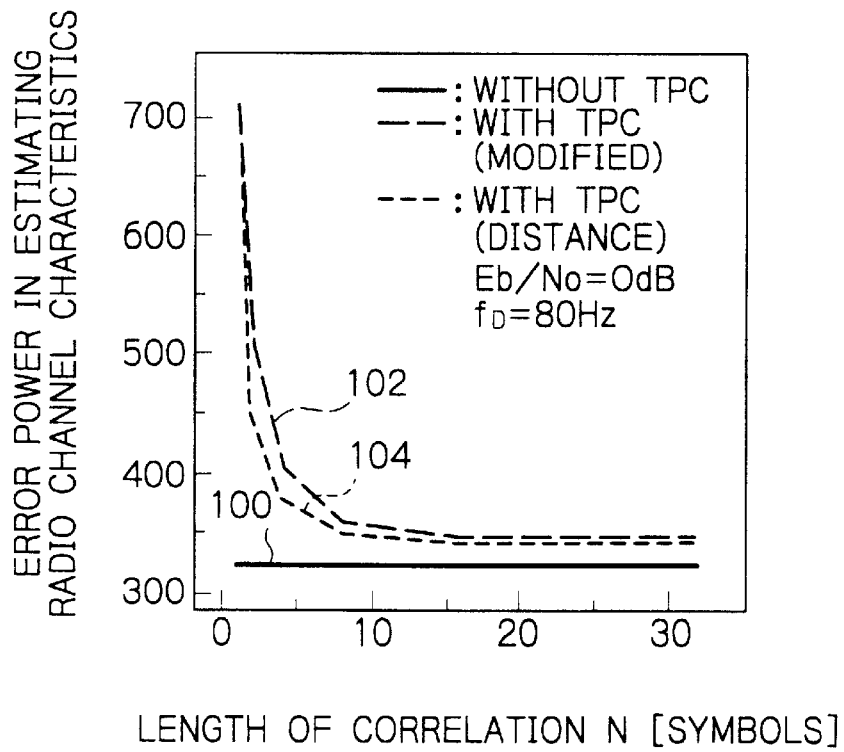
FIGS. 6–10 plot the results from simulating the method of estimating the radio channel characteristics in accordance with the invention by a computer.

In FIG. 6 showing the results from the computer simulation, the horizontal axis plots the length of correlation, i.e. the number of the symbols, N in the field FE, while the vertical axis does the mean value in power of the difference of the estimated values PV from the characteristics of the actual radio transmission channel, i.e. the error power in estimating the radio transmission channel characteristics. The three curves are plotted in the figure under the conditions of the ratio of the noise power density to the signal power density per bit, Eb/N0=0 dB, and the Doppler frequency, fD=80 Hz. This means that the signal power density is equal to the noise power density, and the angle θ 1, described earlier, varies at the rate of 360 angular degrees multiplied with 80 per second.

The solid curve 100 in the figure was applied to the pilot channel without TPC bits, in other words, the TPC field TE of the pilot signals which were not modulated with the TPC bits. The solid line 100 shows the error power in estimating the radio channel characteristics maintained around 330 over the range of the correlation length N from zero to 30. The two dotted curves 102 and 104 were applied to the TPC field TE of the pilot signals modulated with the TPC bits. The one dotted curve 102 was applied to the modified mode of operation, while the other 104 to the distance mode of operation, both described above. From FIG. 6, it is understood that in both the modified and the distance mode of operation the error power in estimating the radio channel characteristics almost stably reaches the proximity to 350 at N=9, and is completely stable at N=16.

Figure 7:
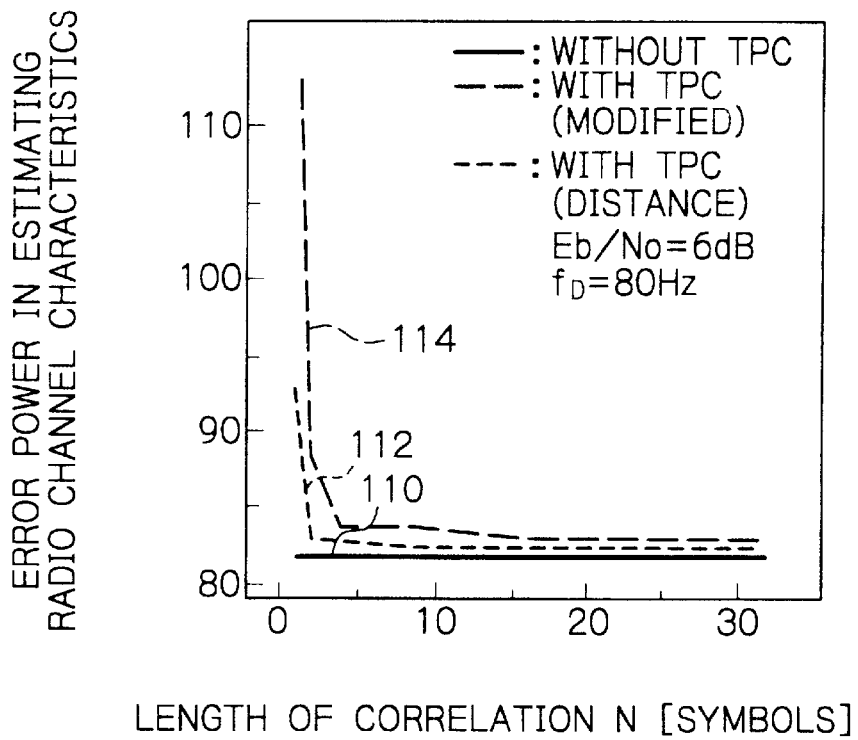

In FIG. 7, showing the same plots as FIG. 6 except Eb/N0=6 dB rather than Eb/N0=0 dB, the error power for the pilot signals without being modulated with the TPC bits, a solid curve 110 takes around 82 stably over the entire range from N=0 to N=30. In the distance mode of operation, the error power, plotted with a dotted curve 112, almost stably reaches the proximity to 83 at N=2 or more, and in the modified mode of operation, the error power, plotted with another dotted curve 114, almost stably reaches the proximity to 84 at N=5 or more. In both modes of operation, the error power is completely stable at N=16.

It is understood from FIGS. 6 and 7 that the number of the symbols N in the field FE preceding the TPC field TE does not always have to be "16" but may slightly be smaller than 16. This follows that the number of the chips included in the preceding field FE is not required to be equal to the number of the chips in the TPC field TE. The results from the computer simulation suggests that the satisfactory estimation of the radio channel characteristics can be obtained when N=5 or its proximity, for example. It is of course to be understood that the number N of the chips required in the field FE depends upon the conditions under which the computer simulation is carried out. In practice, therefore, in order to select an appropriate number N of the chips in the field FE at a base station, account is to be taken of at least the seven simulation conditions (1)–(7), described above, such as the conditions of a radio channel in question.

Figure 8:
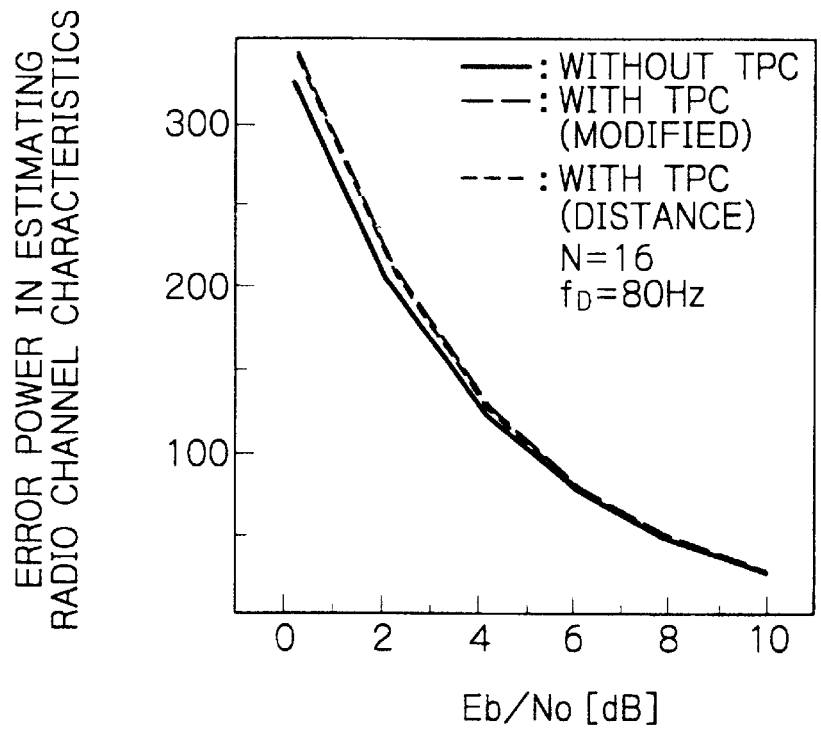

In FIG. 8, the horizontal axis plots Eb/N0 in dB and the vertical axis plots the error power in estimating the radio channel characteristics. The simulation results are plotted with the number N of the symbols in the field FE fixed to N=16. FIG. 8 clarifies that there is almost no difference between the three cases; the modified mode of operation with TPC modulation, the distance mode of operation with TPC modulation, and the operation without the TPC modulation.

Figure 9:
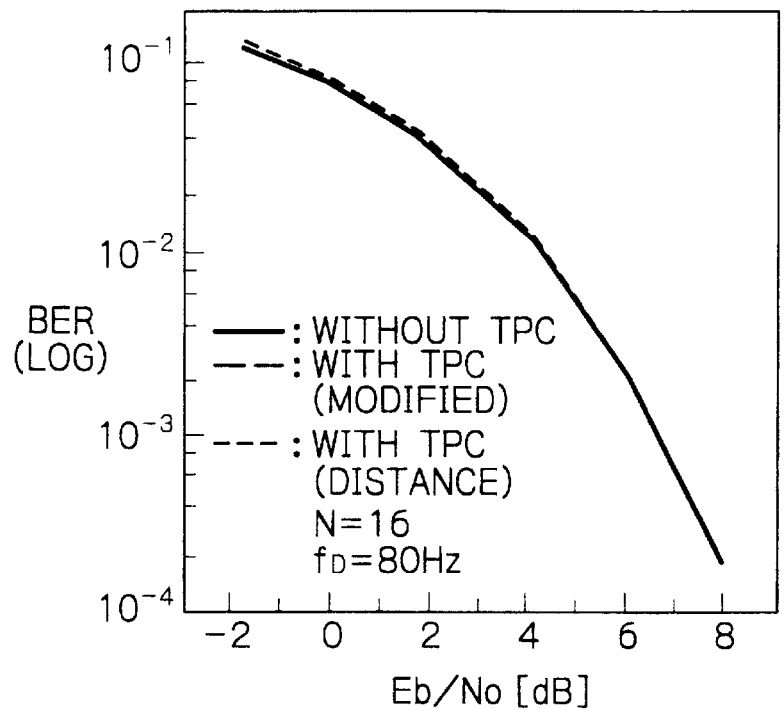
Figure 10:
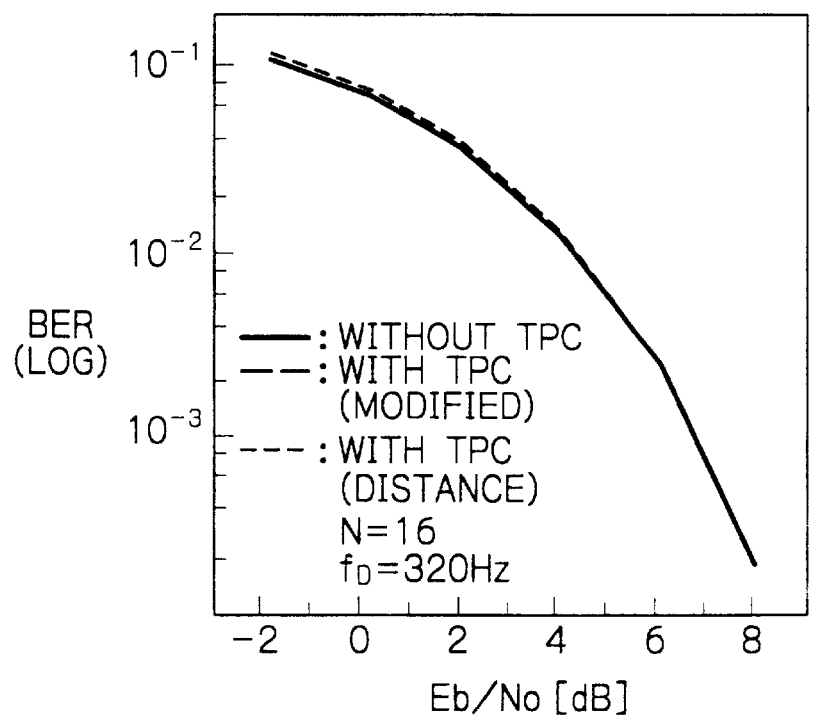

In FIG. 9, the horizontal axis plots Eb/N0 in dB and the vertical axis plots the bit error rate, BER, with the number N of the symbols in the field FE fixed to N=16. Similarly, FIG. 10 has its horizontal axis denoting Eb/N0 in dB and its vertical axis denoting the bit error rate, BER, with the number N of the symbols in the field FE fixed to N=16 but the Doppler frequency, fD=320 Hz fixed rather than 80 Hz. Significant difference is not found between the three cases; the modified and the distance mode of operation with TPC modulation, and the operation without the TPC modulation.

Consequently, it is appreciated that the number N of the bits in the field FE preceding the TPC bit field TE is sufficiently large to a certain extent so that the results from the computer simulation are not different between those three cases; the modified and the distance mode of operation with TPC modulation, and the operation without the TPC modulation. This means that the embodiment shown and described above is advantageously applicable, and both the modified and the distance mode of operation are advantageously effective.

There is no significant difference between the modified and the distance mode of operation but the modified mode of operation appears more advantageous than the distance mode of operation in that the former simplifies the circuitry in structure and the processings. It could be appreciated that the heavier conditions under which the computer simulation is performed the more significant differences between those three cases, especially between the modified and the distance mode of operation.

With the illustrative embodiment shown and described above, the radio channel characteristics are allowed to be estimated by using all the chips included in the pilot channel on the reverse link with part of the pilot signals modulated with the TPC bits in the cdma2000 system, as supported by the computer simulation described above.

The illustrative embodiment is applied to the reverse link from a base station. The invention is, however, also applicable to the forward link from a base station to a mobile station or telephone terminal, in which link the TPC bits are inserted. The embodiment descibed above could be applicable to receiver circuitry involved in a mobile station on such a forward link.

With the preferred embodiment described above, the pilot channel is provided separately from a utility data channel. The invention is also applicable to a system in which the pilot signals are periodically included in a utility data channel. For example, in a system in which the pilot signals are inserted in a user information, or utility data, channel at a predetermined interval, the TPC bits included in the periodic fields which would otherwise have not been modulated with the TPC bits will be replaced with one of the binary values which is determined according to the present invention, for being used for the following estimation of the radio channel characteristics.

More specifically, the signals appearing as close as possible on the time axis to the TPC bits in the pilot channel are used for restoring the pilot signals which would otherwise be included, and on the basis of which the following processings, such as the moving averaging, are executed to estimate the radio channel characteristics. The closest signals in the pilot channel to the TPC bit field in question are used because the closer signals on the time axis are taken in the pilot channel the better conditions of the radio channel follow since the radio channel conditions are changeable from time to time. In that sense, the signals immediately following the TPC bit field on the pilot channel may be used, and the signals immediately preceding the TPC bit field may additionally be used. In order to use the signals immediately following the TPC bits, the TPC bits have to be stored in a memory, this being silghtly less advantageous in the circuit structure, processings and processing rates.

More in general, the present invention is commonly applicable to the systems in which the positions of the signals which would otherwise not have been modulated with reference signals according to the periodicity are modulated. The invention is also applicable to the system in which the signals are modulated with modulating signals other than TPC bits.

In some specific applications in which only a reference signal is transmitted without being followed by utility data signals, the invention is applied to determine the characteristics of the radio channel by receiving soly the reference signal. This means that the invention is more generally applicable to the case where reference signals are transmitted continuously or periodically on a time axis to estimate the characteristics of the radio channel on the basis of the reference signals received.

Thus, the present invention is broadly applicable to the systems in which signals other than reference signals are included at the positions of the signals which would otherwise not have been modulated with reference signals according to the continuity or periodicity on a time axis to achieve a continuous estimation of the characteristics of the radio channel without being interrupted by the signals other than reference signals.

The entire desclosure of Japanese patent application No. 206133/1998 filed on Jul. 22, 1998 including the specification, claims, accompanying drawings and abstract of the disclosure is incorporated herein by reference in its entirety.

While the present invention has been described with reference to the particular illustrative embodiment, it is not to be restricted by the embodiment. It is to be appreciated that those skilled in the art can change or modify the embodiment without departing from the scope and spirit of the present invention.

What is claimed is:

1. A method of estimating characteristics of a radio channel over which a reference signal is transmitted consecutively together with an additional signal, other than the reference signal, with a sequence of spread spectrum codes multiplied, with each of the reference signal and the additional signal, said method comprising:
    a first step of receiving the reference signal and the additional signal from the radio channel and demodulating the reference signal and the additional signal received into a baseband signal;
    a second step of obtaining in the baseband signal a correlated value of at least a first part of the reference signal which is closer to the additional signal on a time axis with the sequence of spread spectrum codes to produce a first correlated value;
    a third step of obtaining in the baseband signal a correlated value of the additional signal with the sequence of spread spectrum codes to produce a second correlated value;
    a fourth step of processing the first correlated value and the second correlated value to determine data represented by the additional signal;
    a fifth step of removing the data from the additional signal so as to restore a second part of the reference signal which would have appeared unless multiplied with the sequence of spread spectrum codes; and
    a sixth step of estimating the characteristics of the radio channel on the basis of the reference signal including the first part and the second part from which the data have been removed.

2. The method in accordance with claim 1, wherein the first part of the reference signal immediately precedes the second part of the reference signal on the time axis and continues for a predetermined duration.

3. The method in accordance with claim 1, wherein said fourth step comprises:
    a first substep of dividing the additional signal into sets of a predetermined number of chips;
    a second substep of obtaining the second correlated value for each of the sets of chips; and
    a third substep of repetitively processing the first correlated value with different ones of the second correlated values obtained for all of the sets of chips to thereby determine the data represented by the additional signal.

4. The method in accordance with claim 3, wherein said third substep comprises:

a fourth substep of obtaining a reference point corresponding to the first correlated value on a plane defined by an in-phase axis and a quadrature axis;
    a fifth substep of obtaining on the plane a first point corresponding to the second correlated value and a second point which has an in-phase component and a quadrature component respectively equal to an in-phase component and a quadrature component of the first point and a sign opposite to a sign of the first point;
    a sixth substep of determining on the plane distance for each of the first and second points from the reference point; and
    a seventh substep of selecting one of the first and second points which has the shorter distance from the reference point to obtain a hard decision value of the selected point as the data represented by the additional signal.

5. The method in accordance with claim 3, wherein said third substep comprises:
    a fourth substep of obtaining a reference point corresponding to the first correlated value on a plane defined by an in-phase axis and a quadrature axis;
    a fifth substep of selecting larger one of an in-phase component and a quadrature component of the reference point, and determine a sign of the selected component of the reference point;
    a seventh substep of obtaining on the plane a first point corresponding to the second correlated value and a second point which has an in-phase component and a quadrature component respectively equal to an in-phase component and a quadrature component of the first point and a sign opposite to a sign of the first point;
    an eighth substep of selecting one of the first and second points which has either of an in-phase component and a quadrature component which has the same sign as the sign of the component of the reference point selected in said fifth substep, and determining a sign of the selected point; and
    a ninth substep of determining the data represented by the additional signal on the basis of the sign of the selected component of the reference point determined in said fifth substep and the sign of the selected point determined in said eighth substep.

6. The method in accordance with claim 2, wherein the predetermined duration is substantially equal to a duration of the second part of the reference signal.

7. Apparatus for estimating characteristics of a radio channel over which a reference signal is transmitted consecutively together with an additional signal, other than the reference signal, with a sequence of spread spectrum codes multiplied with each of the reference signal and the additional signal, comprising:
    a demodulator for receiving the reference signal and the additional signal from the radio channel and demodulating the reference signal and the additional signal received into a baseband signal;
    a first correlator circuit for obtaining in the baseband signal a correlated value of at least a first part of the reference signal which is closer to the additional signal on a time axis with the sequence of spread spectrum codes to produce a first correlated value;
    a second correlator circuit for obtaining in the baseband signal a correlated value of the additional signal with the sequence of spread spectrum codes to produce a second correlated value;
    a determining circuit for processing the first correlated value and the second correlated value to determine data represented by the additional signal;

a data remover circuit for removing the data from the additional signal so as to restore a second part of the reference signal which would have appeared unless multiplied with the sequence of spread spectrum codes; and an estimator circuit for estimating the characteristics of the transmission channel on the basis of the reference signal including the first part and the second part with the data removed by said data remover circuit.

8. The apparatus in accordance with claim 7, wherein the first part of the reference signal immediately precedes the second part of the reference signal on the time axis and continues for a predetermined duration.

9. The apparatus in accordance with claim 7, wherein said determining circuit divides the additional signal into sets of a predetermined number of chips, obtaining the second correlated value for each of the sets of chips, repetitively processing the first correlated value with different ones of the second correlated values obtained for all of the sets of chips to thereby determine the data represented by the additional signal.

10. The apparatus in accordance with claim 8, wherein the predetermined duration is substantially equal to a duration of the second part of the reference signal.

11. The apparatus in accordance with claim 7, wherein the second part of the reference signal is periodically received by said demodulator.

12. The apparatus in accordance with claim 7, wherein the reference signal and the additional signal are transmitted to said demodulator in accordance with the cdma2000 system, the reference signal being a pilot signal, the additional signal containing a TPC (Transmission Power Control) bit.

13. The apparatus in accordance with claim 7, wherein said estimator circuit comprises a moving averaging circuit for deriving an average of a series of a predetermined number of chips forming the reference signal containing the first part and the second part with the data removed by said data remover circuit.

14. The apparatus in accordance with claim 9, wherein said determining circuit obtains a reference point corresponding to the first correlated value on a plane defined by an in-phase axis and a quadrature axis, obtaining on the plane a first point corresponding to the second correlated value and a second point which has an in-phase component and a quadrature component respectively equal to an in-phase component and a quadrature component of the first point and a sign opposite to a sign of the first point, determining on the plane a distance of each of the first and second points from the reference point, selecting one of the first and second points which has the shorter distance from the reference point to obtain a hard decision value of the selected point as the data represented by the additional signal.

15. The apparatus in accordance with claim 9, wherein said determining circuit obtains a reference point corresponding to the first correlated value on a plane defined by an in-phase axis and a quadrature axis, selecting larger one of an in-phase component and a quadrature component of the reference point, determining a sign of the selected component of the reference point, obtaining on the plane a first point corresponding to the second correlated value and a second point which has an in-phase component and a quadrature component respectively equal to an in-phase component and a quadrature component of the first point and a sign opposite to a sign of the first point, selecting one of the first and second points which has either of an in-phase component and a quadrature component which has the same sign as the sign of the component of the reference point selected, determining a sign of the selected point, determining the data represented by the additional signal on the basis of the sign of the selected component of the reference point determined and the sign of the selected point determined.

16. Apparatus for demodulating a utility data signal transmitted over a radio channel, over which a reference signal is transmitted consecutively together with an additional signal, other than the reference signal, with a sequence of spread spectrum codes multiplied with each of the reference signal and the additional signal, comprising:

a demodulator for receiving the reference signal and the additional signal from the radio channel and demodulating the reference signal and the additional signal received into a baseband signal;

a first correlator circuit operative in response to an estimate signal representative of estimated characteristics of the radio channel for correlating the utility data signal of the baseband signal with the sequence of spread spectrum coded to develop a resultant utility data signal;

a second correlator circuit for obtaining in the baseband signal a correlated value of at least a first part of the reference signal which is closer to the additional signal on a time axis with the sequence of spread spectrum codes to produce a first correlated value;

a third correlator circuit for obtaining in the baseband signal a correlated value of the additional signal with the sequence of spread spectrum codes to produce a second correlated value;

a determining circuit for processing the first correlated value and the second correlated value to determine data represented by the additional signal;

a data remover circuit for removing the data from the additional signal so as to restore a second part of the reference signal which would have appeared unless multiplied with the sequence of spread spectrum codes; and an estimator circuit for estimating the characteristics of the radio channel on the basis of the reference signal including the first part and the second part with the data removed by said data remover circuit to provide the estimate signal representing the estimated characteristics of the radio channel to said first correlator circuit.

* * * * *